US011885669B2

(12) United States Patent
Burns et al.

(10) Patent No.: US 11,885,669 B2
(45) Date of Patent: Jan. 30, 2024

(54) SYSTEMS AND METHODS FOR IMAGING AND SENSING VIBRATIONS

(71) Applicant: PROPHESEE, Paris (FR)

(72) Inventors: Geoffrey F. Burns, Paris (FR);
Manuele Brambilla, Paris (FR);
Christoph Posch, Bad Fischau (AT);
Gaspard Florentz, Paris (FR);
Stephane Valente, Paris (FR)

(73) Assignee: PROPHESEE, Paris (FR)

( * ) Notice: Subject to any disclaimer, the term of this patent is extended or adjusted under 35 U.S.C. 154(b) by 201 days.

(21) Appl. No.: 17/594,551

(22) PCT Filed: Apr. 24, 2020

(86) PCT No.: PCT/EP2020/061566
§ 371 (c)(1),
(2) Date: Oct. 21, 2021

(87) PCT Pub. No.: WO2020/216953
PCT Pub. Date: Oct. 29, 2020

(65) Prior Publication Data
US 2022/0205835 A1     Jun. 30, 2022

Related U.S. Application Data

(60) Provisional application No. 62/838,769, filed on Apr. 25, 2019.

(51) Int. Cl.
*G01H 9/00*     (2006.01)
(52) U.S. Cl.
CPC ............................ *G01H 9/002* (2013.01)

(58) Field of Classification Search
CPC ............. G01H 9/002; G01H 9/00; G01D 5/26
(Continued)

(56) References Cited

U.S. PATENT DOCUMENTS

2018/0262705 A1   9/2018   Park et al.
2019/0011310 A1   1/2019   Turnbull et al.

FOREIGN PATENT DOCUMENTS

WO   WO 2018/042424 A1   3/2018

OTHER PUBLICATIONS

Charles Dorn et al., "Efficient Full-Field Vibration Measurements and Operational Modal Analysis Using Neuromorphic Event-Based Imaging", Journal of Engineering Mechanics, vol. 144, No. 7, Jul. 1, 2018, p. 04018054.

(Continued)

*Primary Examiner* — Daniel L Murphy
(74) *Attorney, Agent, or Firm* — Finnegan, Henderson, Farabow, Garrett & Dunner, LLP

(57) ABSTRACT

The present disclosure generally relates to systems and methods for imaging and sensing vibrations of an object. In one implementation, a system is provided for detecting vibrations that comprises a sensor with a plurality of pixels, each pixel including at least one photosensitive element. The sensor is configured to output signals related to illumination on each pixel. The system also includes at least one processor configured to receive the output signals from the sensor and detect, based on the output signals, one or more polarities. The at least one processor is also configured to determine timestamps associated with the output signals, analyze the timestamps and the polarities to detect vibrations of an object in the field of view of the sensor, and determine one or more frequencies of the detected vibrations.

29 Claims, 12 Drawing Sheets

(58) Field of Classification Search
USPC .............................................................. 367/7
See application file for complete search history.

(56) References Cited

OTHER PUBLICATIONS

Zhenjiang Ni et al., "Asynchronous Event-Based Visual Shape Tracking for Stable Haptic Feedback in Microrobotics", IEEE Transactions on Robotics, IEEE Service Center, Piscataway, NJ, vol. 28, No. 5, Oct. 1, 2012, pp. 1081-1089.
International Search Report and Written Opinion of related International Application No. PCT/EP2020/061566, dated May 10, 2020.

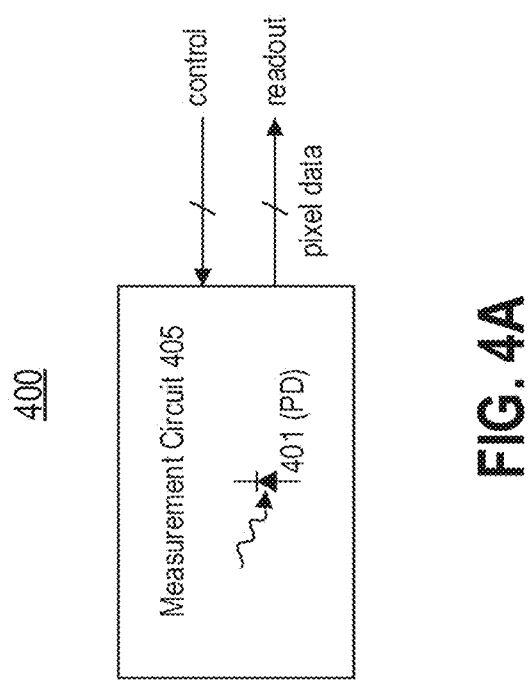

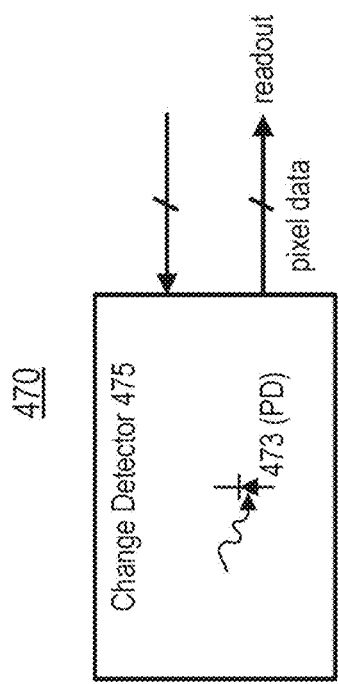

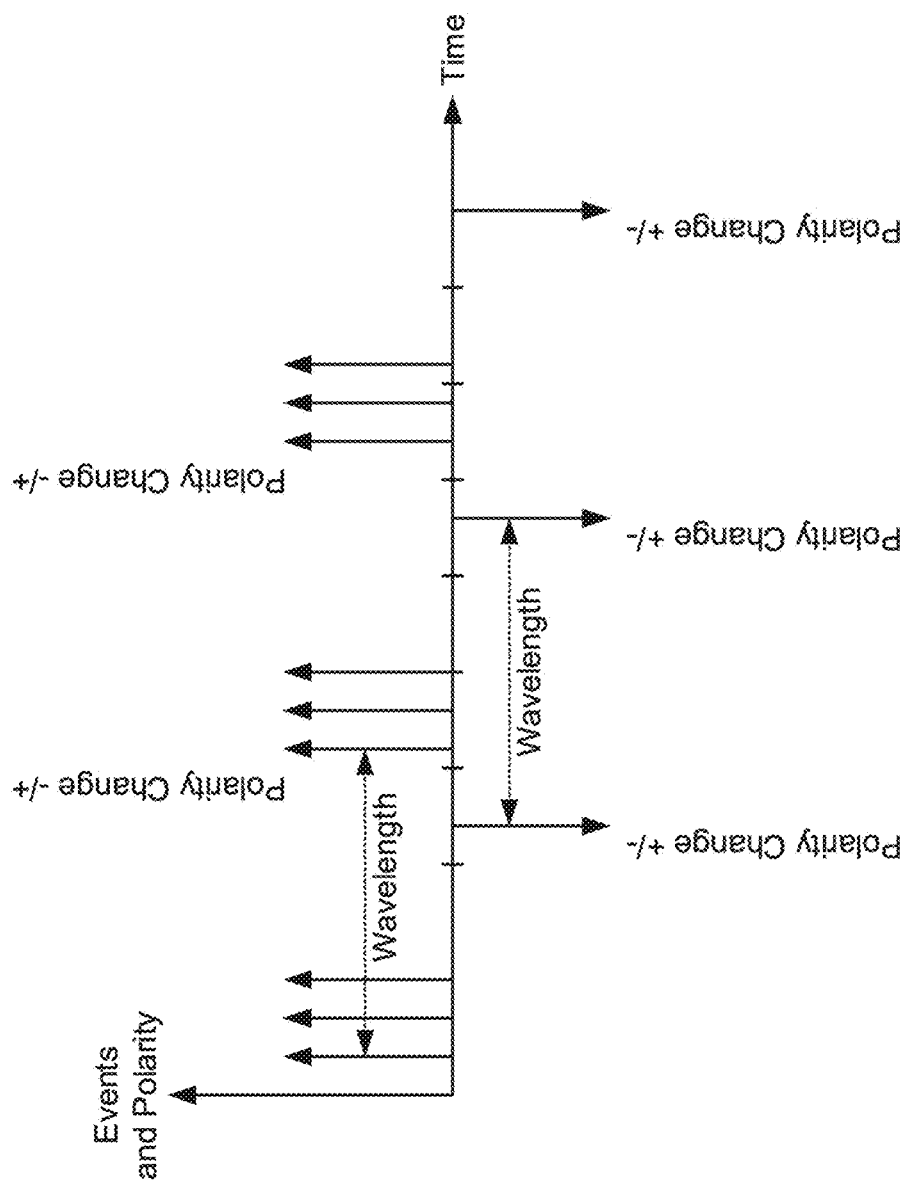

SYSTEMS AND METHODS FOR IMAGING AND SENSING VIBRATIONS

RELATED APPLICATIONS

The present application is a national stage entry under 35 U.S.C. § 371 of International Application No. PCT/EP2020/061566, filed on Apr. 24, 2020, which claims the priority of U.S. Provisional Application No. 62/838,769 filed on Apr. 25, 2019. The above applications are expressly incorporated into the present disclosure by reference to their entireties.

TECHNICAL FIELD

The present disclosure relates generally to the field of imaging and sensing characteristics of objects. More specifically, and without limitation, this disclosure relates to computer-implemented imaging systems and methods for detecting and analyzing vibrations of objects. The disclosure additionally relates to implementing and using pixel-based sensors for vibration detection and analysis. The sensors and techniques disclosed herein may be used in various applications and systems, such as the analysis of moving mechanical elements, like a rotating turbine or shaft, systems for monitoring the health of an engine or vehicle, and other applications and systems that benefit from accurate and efficient vibration analysis.

BACKGROUND

Extant vibrational sensors, such as accelerometers, directly contact the device or element whose vibrations are being measured. Such sensors alter the mechanical properties of these apparatuses and thus lack accuracy. There are also other disadvantages, such as the inability to make measurements where the vibrating piece or element is hot, inaccessible, or too small and applying a contacting sensor is not possible.

In some applications, fiber optics with a non-coherent light (such as a light emitted diode (LED)) and a photodetector may be used to provide a non-contact vibration detector. However, such implementations have no ability to resolve vibrations across space. Moreover, accuracy is generally limited to the sensitivity of the photodetector to changing illumination of the non-coherent light.

Without sufficient accuracy, it is difficult to detect slow decays of mechanical elements and machinery because slow changes in vibrational patterns (e.g., frequencies, amplitudes, or the like) may not be detected. Moreover, without spatial resolution, multi-part machinery cannot be accurately monitored if different parts of the machinery exhibit different vibrational patterns.

Therefore, vibration sensing solutions with high accuracy (e.g., based on high temporal resolution), as well as improved spatial resolution, are desirable.

SUMMARY

Embodiments of the present disclosure provide computer-implemented systems, methods and non-transitory computer storage media, that address the above-mentioned drawbacks. Embodiments of the present disclosure include embodiments for vibrational detection and analysis with high temporal resolution. In addition, embodiments of the present disclosure provide systems and methods for vibrational detection and analysis with the ability to distinguish frequencies and amplitudes across space. These and other features, aspects and embodiments of the present disclosure are described in detail herein, with reference to FIGS. 3-9.

In some embodiments, the generated data may include a plurality of frequencies and amplitudes, allowing for a two-dimensional image of vibrations in a scene to be generated, e.g., as a vibrational map. An example of such a map is illustrated in FIG. 9 and explained further below. Additionally, embodiments of the present disclosure may be used for monitoring mechanical elements and objects, such as factory machinery, vehicles, or the like, such that decay of components may be detected early by identifying changes in vibrational patterns with greater accuracy than extant techniques.

Embodiments of the present disclosure may use natural light or artificial illumination of an object undergoing vibrations, and/or may project electromagnetic pulses (whether uniform or structured) to generate reflections of the object at a sensor. In some embodiments, the sensor may include a plurality of pixels and index the received reflections by location(s) of the pixel(s) receiving the reflections. Accordingly, embodiments of the present disclosure may calculate and map vibrations and amplitudes to a two-dimensional projection of the scene based on the spatial coordinates of the pixel(s).

To process frequency with greater accuracy, embodiments of the present disclosure may apply an event counter to discard spurious events. Thus, a vibration may be detected while eliminating noise to increase accuracy of the frequency calculation. Accordingly, embodiments of the present discourse may solve some of the drawbacks of extant techniques, as explained above.

In some embodiments, the temporal resolution may be further increased by using an event-based sensor. Such a sensor may capture events in a scene based on changes in the illumination at certain pixels exceeding a threshold. Sensors can operate asynchronously and detect events from reflections of the scene while reducing the amount of data generated. Accordingly, the temporal resolution may be increased.

The reduction in data due to the use of event-based sensors, as described above, may allow the rate of light sampling at each pixel to be increased, e.g., from 30 times per second or 60 times per second (i.e., frame-rates of typical CMOS image sensors) to higher rates such as 1,000 times per second, 10,000 times per second and more. The higher rate of light sampling increases the accuracy of the frequency calculation compared with extant techniques.

Embodiments of the present disclosure may also provide for spatial resolution of frequency, unlike extant approaches. For example, events can be detected at individual pixels (and, thus frequencies may be calculated for individual pixels as well) rather than relying on general changes in illumination or other properties across a whole image sensor. Moreover, the use of event-based sensors further improves this spatial resolution.

Embodiments of the present disclosure may detect amplitude as well as frequency in an image. For example, embodiments of the present disclosure may normalize a calculated frequency by a number of events detected in order to determine amplitudes. The accuracy of the calculated amplitudes may thus increase with increased accuracy of the frequency. Moreover, because events are detected at individual pixels, the amplitudes may be determined across space rather than generally over the whole sensor. In addition, amplitudes may be detected with greater accuracy if event-based sensors are used.

In accordance with an aspect of the disclosure there is provided a system for detecting vibrations comprising a sensor. The sensor may comprise a plurality of pixels, each pixel including at least one photosensitive element. The sensor may be configured to output signals related to the illumination on each pixel. The system may further comprise at least one processor configured to: receive the output signals from the sensor; determine, based on the output signals, one or more changes in illumination, the one or more changes comprising polarity information, the polarity information being indicative of whether the changes in illumination are associated with increasing or decreasing illumination; determine timestamps associated with the one or more changes; analyze the timestamps and the polarity information to detect vibrations of an object in the field of view of the sensor; and determine one or more frequencies of the detected vibrations.

In such embodiments, the at least one processor may be configured to determine a positive polarity when a change in illumination is indicative of an increase in illumination, and to determine a negative polarity when a change in illumination is indicative of a decrease in illumination.

In any of these embodiments, the changes in illumination may be associated with a set of pixels among the plurality of pixels of the sensor. For example, the one or more frequencies may be associated with the set of pixels based on the changes in illumination.

In any of these embodiments, the at least one processor may be configured to determine the timestamps by extracting the plurality of timestamps from a readout system associated with the sensor. For example, the readout system may encode the one or more timestamps based on an address-event representation (AER) protocol. Additionally or alternatively, the readout system may encode an address identifying an associated pixel for each output signal.

In any of these embodiments, the at least one processor may be configured to analyze the timestamps by calculating time intervals between changes of one or more polarities using the plurality of timestamps, and determine the one or more frequencies based on the calculated time intervals. In such embodiments, the at least one processor may be further configured to calculate a mean value or a median value and a deviation associated with the calculated time intervals, determine the one or more frequencies based on an inverse of the mean value when the mean value is calculated, or determine the one or more frequencies based on the median value when the median value is calculated, and validate the one or more frequencies when the deviation is below a validation threshold. For example, the validation threshold may be between approximately 1% and 10% of the mean value or the median value. The validation threshold may be greater than or equal to 1% and less than or equal to 10% of the mean value or the median value, as the case may be.

In any of these embodiments, the at least one processor may be configured to analyze output signals associated with one or more of the plurality of pixels to determine one or more amplitudes of the vibrations. For example, the at least one processor may be configured to apply a spatial filter to output signals from the plurality of pixels, and determine, based on the applied spatial filter, the one or more amplitudes. Additionally or alternatively, the at least one processor may be configured to determine a shape of an object undergoing the vibrations and perform two-dimensional shape tracking on the output signals to determine the one or more amplitudes. For example, the at least one processor may be configured to perform two-dimensional shape tracking by applying an iterative closest point algorithm.

Additionally or alternatively, the at least one processor may be configured to determine a number of changes in illumination from at least one of the plurality of pixels within a unit of time, and normalize the number of changes by a determined frequency of the one or more frequencies associated with the at least one pixel to determine the one or more amplitudes. For example, the unit of time may be approximately 1 ms or less. The unit of time may be less than or equal to 1 ms.

In any of these embodiments, the system may further comprise an external light source that projects light on the object in the field of view of the sensor. For example, the external light source may project uniform light or structured light. The external light source may project light having a constant illumination. The external light source may project light comprising a structured illumination pattern. In such embodiments, the external light source may project the light at an angle oblique to at least one surface of the object.

In any of these embodiments, the at least one processor may be configured to filter the one or more changes in illumination to remove spurious changes.

In any of these embodiments, the at least one processor may be configured to eliminate timestamps having a difference greater than or equal to a time threshold. For example, the time threshold used to eliminate timestamps may be greater than or equal to 1 ms.

In some embodiments, a system for detecting vibrations may comprise a sensor. The sensor may comprise a plurality of photosensitive elements configured to detect levels of illumination on the elements; a plurality of change detectors configured to output signals when changes in the detected levels of illumination on one or more of the photosensitive elements exceed a threshold; and at least one processor. The at least one processor may be configured to receive the output signals; determine polarities based on the output signals, the polarities being indicative of whether the illumination is increasing or decreasing; determine timestamps associated with the output signals from the plurality of change detectors; analyze the timestamps and the polarities to detect vibrations of an object in the field of view of the sensor; and determine one or more frequencies of the detected vibrations.

In such embodiments, a positive polarity is associated with an increase in illumination, and a negative polarity is associated with a decrease in illumination.

In any of these embodiments, the polarities may be associated with a set of pixels, and each pixel may include at least one of the plurality of photosensitive elements. Accordingly, the one or more frequencies may be associated with the set of pixels based on the polarities.

In any of these embodiments, the at least one processor may be configured to determine the timestamps by extracting the plurality of timestamps from a readout system associated with the sensor. For example, the readout system may encode the one or more timestamps based on an address-event representation (AER) protocol. Additionally or alternatively, the readout system may encode an address identifying an associated pixel for each output signal.

In any of these embodiments, the at least one processor may be configured to analyze the timestamps to calculate time intervals between changes of the one or more polarities using the plurality of timestamps, and determine the one or more frequencies based on the calculated time intervals. In such embodiments, the at least one processor may be further configured to calculate a mean value or a median value, and a deviation associated with the calculated time intervals, determine the one or more frequencies based on an inverse of the mean value when the mean value is calculated, or determine the one or more frequencies based on an inverse of the median value when the median value is calculated, and validate the one or more frequencies when the deviation is below a validation threshold. For example, the validation threshold may be between approximately 1% and 10% of the mean value or the median value. The validation threshold may be greater than or equal to 1% and less than or equal to 10% of the mean value or the median value, as the case may be.

In any of these embodiments, the at least one processor may be configured to analyze the output signals to determine one or more amplitudes of the vibrations. For example, the at least one processor may be configured to apply a spatial filter to the output signals and determine, based on the applied spatial filter, the one or more amplitudes. Additionally or alternatively, the at least one processor may be configured to determine a shape of an object undergoing the vibrations, and perform two-dimensional shape tracking on the output signals to determine the one or more amplitudes. For example, the at least one processor may be configured to perform two-dimensional shape tracking by applying an iterative closest point algorithm.

Additionally or alternatively, the at least one processor is configured to determine a number of changes in illumination from at least one of a plurality of pixels within a unit of time, and normalize the number of changes by a determined frequency of the one or more frequencies associated with the at least one pixel to determine the one or more amplitudes. For example, the unit of time may be approximately 1 ms or less. The unit of time may be less than or equal to 1 ms.

In any of these embodiments, the system may further comprise an external light source configured to project light on the object in the field of view of the sensor. For example, the external light source may project uniform light or structured light. The uniform light may relate to light having a constant illumination. The structured light may relate to light comprising a structured illumination pattern. In such embodiments, the external light source may project the light at an angle oblique to at least one surface of the object.

In any of these embodiments, the at least one processor may be configured to filter the one or more output signals to remove spurious signals.

In any of these embodiments, the at least one processor may be configured to eliminate a timestamp associated with a time difference greater than or equal to a time threshold. For example, the time threshold may be approximately 1 ms or more. The time threshold may be greater than or equal to 1 ms.

In accordance with an aspect of the disclosure there is provided a method for detecting vibrations. The method may comprise receiving, from a sensor including a plurality of pixels, output signals associated with illumination on one or more of the pixels, each of the pixels including at least one photosensitive element; determining, based on the output signals, polarities indicative of whether the illumination on one or more pixels is increasing or decreasing; determining timestamps associated with the output signals; analyzing the timestamps and the polarities to detect vibrations of an object in the field of view of the sensor; and determining one or more frequencies of the detected vibrations.

In such embodiments, the method may further comprise determining a positive polarity when illumination on the one or more pixels is increasing, and determining a negative polarity when illumination on the one or more pixels is decreasing.

In any of these embodiments, the output signals may be associated with a set of pixels of the plurality of pixels. Accordingly, the one or more frequencies may be associated with the set of pixels based on the output signals.

In any of these embodiments, the method may further comprise determining the timestamps by extracting the plurality of timestamps from a readout system associated with the sensor. In such embodiments, the readout system may encode the one or more timestamps based on an address-event representation (AER) protocol. Additionally or alternatively, the readout system may encode an address identifying an associated pixel for each output signal.

In any of these embodiments, the method may further comprise analyzing the timestamps by calculating time intervals between changes of the one or more polarities using the plurality of timestamps, and determining the one or more frequencies based on the calculated time intervals. In such embodiments, the method may further comprise calculating a mean value or a median value, and a deviation associated with the calculated time intervals, determining the one or more frequencies based on an inverse of the mean value when the mean value is calculated, or determining the one or more frequencies based on an inverse of the median value when the median value is calculated, and validating the one or more frequencies when the deviation is below a validation threshold. For example, the validation threshold may be between approximately 1% and 10% of the mean value or the median value. The validation threshold may be greater than or equal to 1% and less than or equal to 10% of the mean value or the median value, as the case may be.

In any of these embodiments, the method may further comprise analyzing the output signals to determine one or more amplitudes of the vibrations. In such embodiments, the method may further comprise applying a spatial filter to the output signals and determining, based on the applied spatial filter, the one or more amplitudes. Additionally or alternatively, the method may further comprise determining a shape of an object undergoing the vibrations, and performing two-dimensional shape tracking on the output signals to determine the one or more amplitudes. For example, the method may further comprise performing two-dimensional shape tracking by applying an iterative closest point algorithm.

In any of these embodiments, the method may further comprise determining a number of changes in illumination from at least one of the plurality of pixels within a unit of time and normalizing the number of changes by a determined frequency of the one or more frequencies associated with the at least one pixel to determine the one or more amplitudes. For example, the unit of time is approximately 1 ms or less. The unit of time may be less than or equal to 1 ms.

In any of these embodiments, the method may further comprise projecting light on the object in the field of view of the sensor. For example, projecting uniform light or structured light. The uniform light may relate to light having a constant illumination, and the structured light may relate to light having a structured illumination pattern. In such embodiments the method may further comprise projecting the light at an angle oblique to at least one surface of the object.

Additionally or alternatively, the method may further comprise eliminating a timestamp associated with a time difference greater than or equal to a time threshold. For example, the time threshold may be approximately 1 ms or more. The time threshold may be greater than or equal to 1 ms.

In accordance with a further aspect of the disclosure, there is provided a non-transitory computer readable medium, comprising instructions, which when executed by at least one processor, configure the at least one processor to carry out the previously described method.

Additional objects and advantages of the present disclosure will be set forth in part in the following detailed description, and in part will be unambiguously derivable from the description, or may be learned by practice of the present disclosure. At least some of the objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate various embodiments and, together with the description, serve to explain the principles and features of the disclosed embodiments. In the drawings:

FIG. 4A is a schematic representation of an exemplary sensor pixel, according to embodiments of the present disclosure.

FIG. 4C is a schematic representation of an exemplary sensor pixel, according to embodiments of the present disclosure.

FIG. 5B is a graphical representation of relating frequencies to polarity information, according to embodiments of the present disclosure.

DETAILED DESCRIPTION

Embodiments of the present disclosure relate to systems and methods for detecting and analyzing vibrations. In some embodiments, event-based and/or asynchronous sensors may be used for vibration detection and imaging. Advantageously, the exemplary embodiments can provide fast and accurate vibrational sensing and imaging. Embodiments of the present disclosure may be implemented and used in various applications and systems, such as the analysis of moving mechanical elements, like a rotating turbine or shaft, systems for monitoring the health of an engine or vehicle, and other systems that benefit from accurate and efficient vibration analysis.

Although embodiments of the present disclosure are described with general reference to a pixel-based sensor with photosensitive elements, it will be appreciated that the disclosed embodiments may be implemented with a digital camera, a LIDAR, or other imaging system. Moreover, although some embodiments are described in combination with a projector (such as a laser projector), it will be appreciated that embodiments of the present disclosure may be implemented with ambient lighting in combination with or in lieu of the projector. Also, some embodiments may employ such components separate from the sensors and/or processors described herein.

Embodiments of the present disclosure may detect events to determine vibrational frequencies at one or more pixels of an image sensor. For example, the events may comprise polarity changes. In addition, some embodiments may further determine amplitudes of the vibrations at the one or more pixels. As used herein, the "polarity" may be indicative of whether changes in detected levels of illumination are associated with either increasing illumination or decreasing illumination.

As used herein, a "frequency" may refer to any temporal characteristic defining a vibrational signature. For example, a frequency may comprise the inverse of a wavelength (e.g., a peak-to-peak distance or a trough-to-trough distance) or the like. Moreover, a frequency may be an average or may comprise a plurality of components in Fourier space (also called "k-space") if the vibrational signature does not exhibit a single wavelength. Accordingly, a "frequency" need not be singular but instead may comprise a combinatory measurement of multiple measures or the multiple measures themselves.

Figure 1:
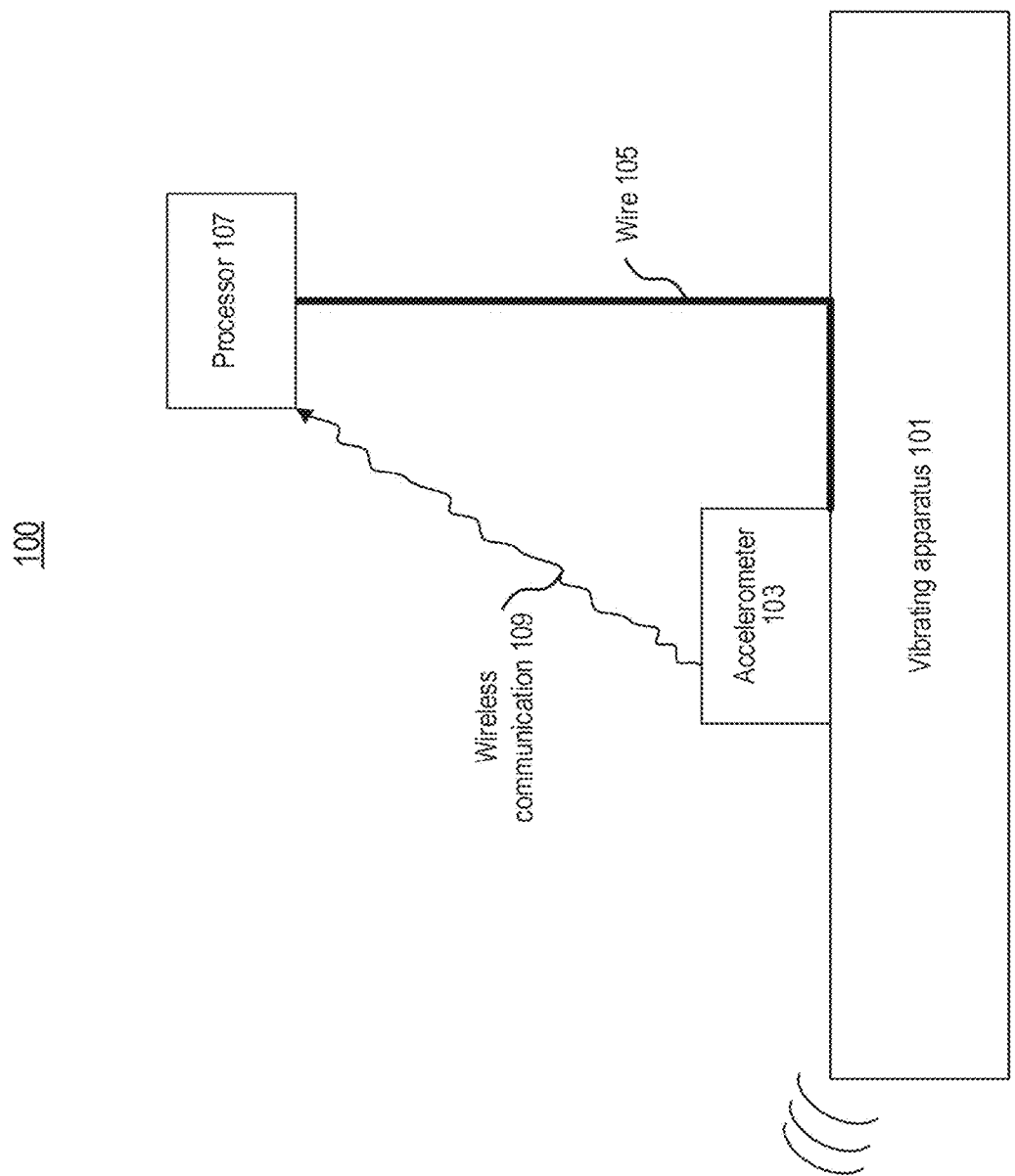
FIG. 1 is a schematic representation of an exemplary accelerometer-based vibration sensor known in the art.

FIG. 1 depicts an accelerator-based detector 100. In the example of FIG. 1, a vibrating apparatus 101 may comprise a factory machine, a part of a motor vehicle, or any other mechanical component or device that exhibits vibrations. To monitor those vibrations, an accelerometer 103 may be attached to a surface of apparatus 101, as depicted in FIG. 1.

Thus, accelerometer 103 is attached to apparatus 101 and modifies any vibrational signature of apparatus 101 accordingly. Correcting for any such modification may require costly post-processing. To avoid further disruption of the vibrational signature, a processor 107 to use data from accelerometer 103 may be implemented separately rather than integrated with accelerometer 103.

To communicate results, accelerometer 103 has at least one wire 105 connected to processor 107 (or any other device using data from accelerometer 103) to determine the vibrational signature. However, wire 105 may contact apparatus 101 (as shown in FIG. 1) and modify the vibrational signature or characteristics of apparatus 101. Alternatively, accelerometer 103 may use wireless communication 109 (e.g., a radio frequency (RF) signal or the like) to communicate results to processor 107. However, using wireless communication may require a reduction in data density from accelerometer 103, a memory attached to accelerometer 103 (further modifying the vibrational signature of apparatus 101) to store results before transmission, and/or a non-continuous monitoring of apparatus 101 to allow for transmissions.

Figure 2:
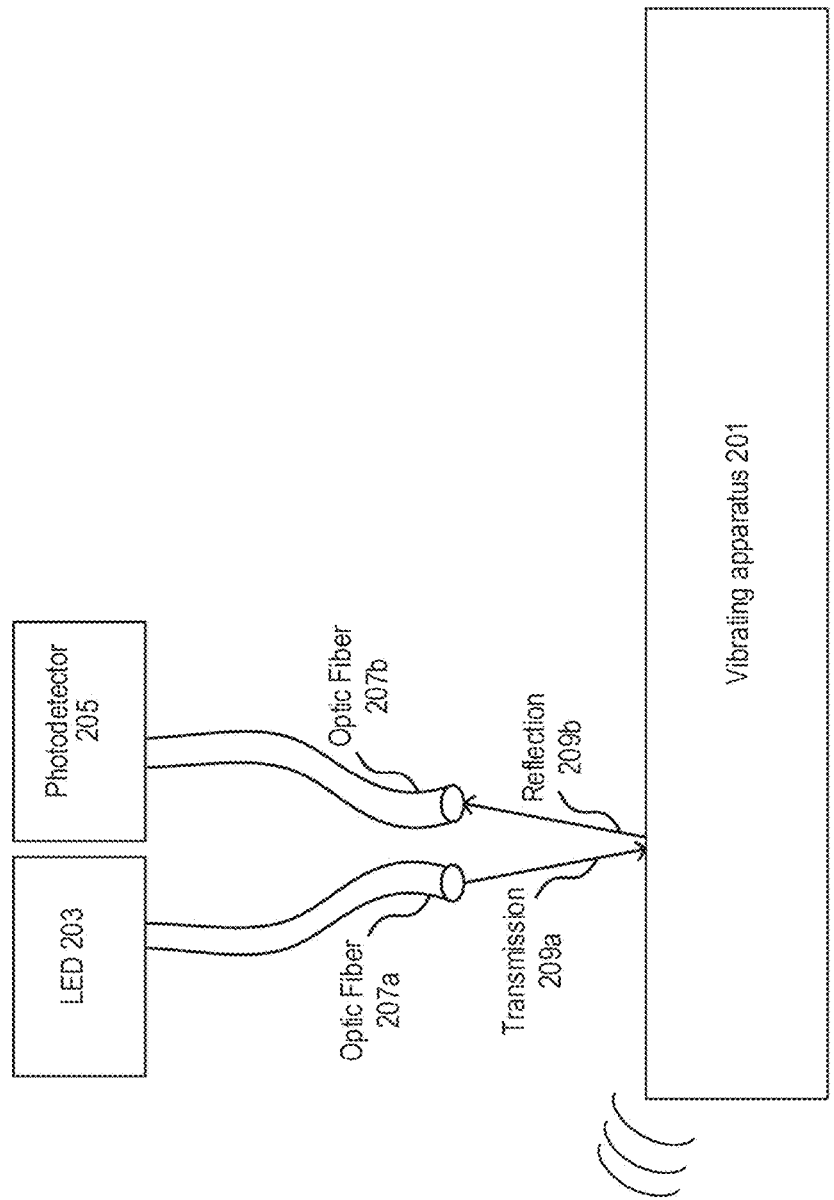
FIG. 2 is a schematic representation of an exemplary fiber optic vibration sensor known in the art.

One improvement over systems like 100 that rely on contact with the object undergoing vibration is depicted in FIG. 2. In FIG. 2 a schematic representation is provided of a fiber optic vibration detector 200. In the example of FIG. 2, vibrating apparatus 201 may comprise a factory machine, a part of a motor vehicle, or any other component or device that exhibits vibrations. To monitor those vibrations, a non-coherent light source (e.g., a light emitting diode (LED) 203) may transmit electromagnetic radiation (e.g., transmission 209a) at a surface of apparatus 201. Although not depicted in FIG. 2, additionally or alternatively, a coherent light source (e.g., a laser source or the like) may transmit the electromagnetic radiation 209a. A photodetector 205 (e.g., one or more photodiodes, charge coupled detectors (CCDs), or the like) may detect reflections of the transmitted radiation (e.g., reflection 209b). As further depicted in FIG. 2, one or more fiber optic cables (e.g., cables 207a and 207b) may guide the transmissions and/or reflections to and/or from surface of apparatus 200 surface of apparatus 200.

Photodetector 205 may detect vibrations based on changes in intensity of reflections (e.g., reflection 209) over time. However, accuracy of this calculation may remain low. Moreover, a single frequency is determined for the whole surface of apparatus 201 from which transmissions are reflected. Accordingly, vibrations with any sort of complexity (e.g., more than one frequency over a single machine) cannot be properly monitored using system 200. In addition, multiple photodiodes would be needed to monitor an amplitude of the surface of apparatus 201, and more than one amplitude over a single machine could still not be properly monitored using system 200.

Accordingly, vibrational monitoring techniques such as those depicted in FIGS. 1 and 2 suffer from low accuracy. Moreover, these techniques suffer from a lack of spatial resolution and other drawbacks. For example, spatial resolution of system 100 of FIG. 1 cannot be increased without using a plurality of accelerometers, which would disrupt the vibrational signature of apparatus 101. Further, system 200 of FIG. 2 cannot distinguish frequencies and amplitudes (and, often, cannot even measure amplitudes) on the surface of apparatus 201. In addition, with respect to FIG. 1, changes in the vibrational signature of apparatus 101 may be indicative of a problem with one or more of the accelerometers (e.g., accelerometer 103) rather than apparatus 101 itself.

Embodiments of the present disclosure provide greater accuracy and spatial resolution of detected frequencies and amplitudes. One example embodiment is shown in FIG. 3, which is further described below.

Figure 3:
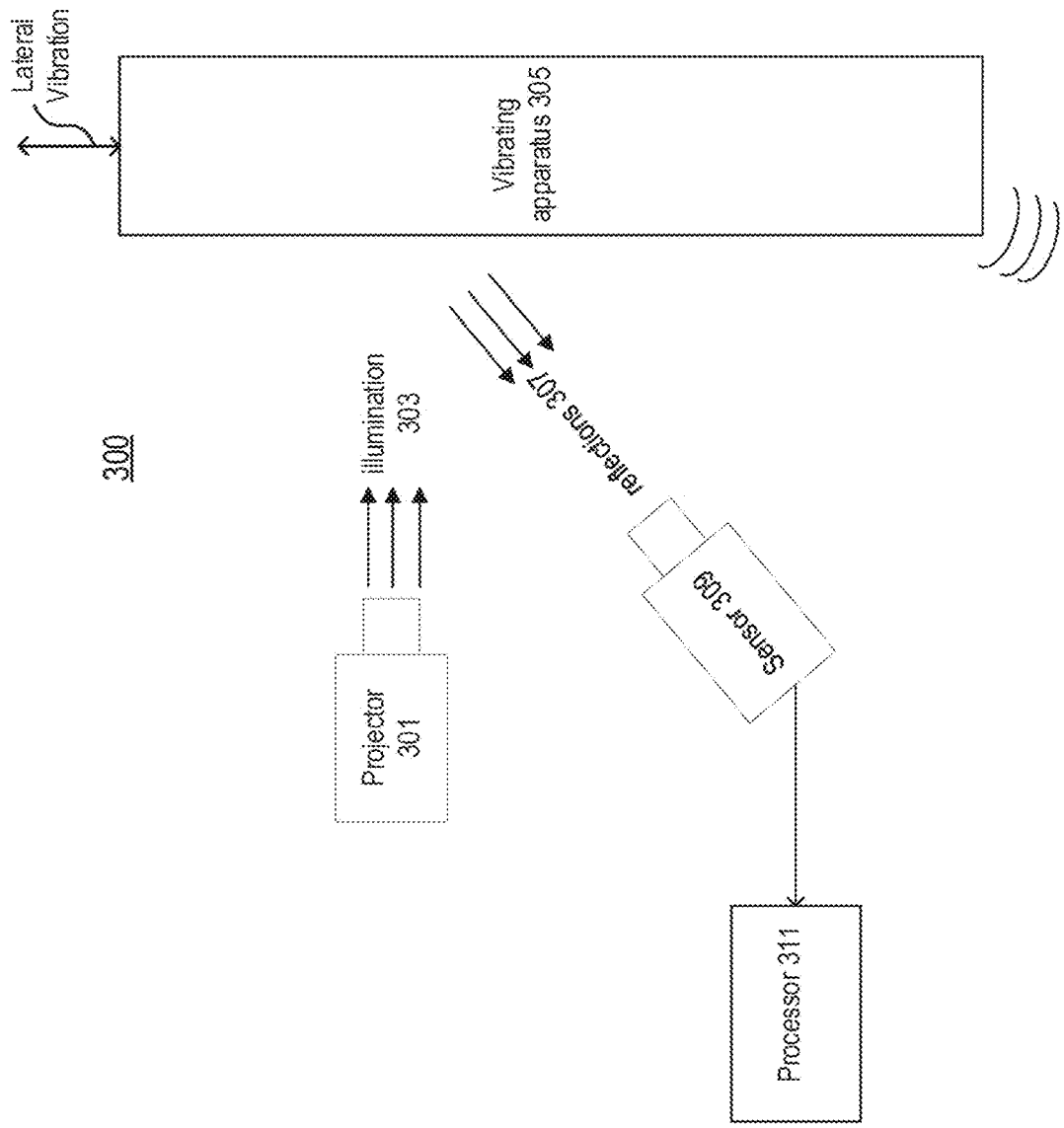
FIG. 3 is a schematic representation of a system using a pixel-based sensor as a vibration detector, according to embodiments of the present disclosure.

FIG. 3 is a schematic representation of a system 300 for vibration detection, consistent with embodiments of the present disclosure. As shown in FIG. 3, a projector 301 may transmit electromagnetic radiation (e.g., illumination 303) toward a surface of vibrating apparatus 305. By way of example, vibrating apparatus 305 may comprise a factory machine, a part of a motor vehicle, or any other component or device that exhibits vibrations.

Projector 301 may comprise one or more laser generators, ultraviolet lamps, visible light lamps, or any other device configured to project electromagnetic radiation towards a surface. In some embodiments, projector 301 may project structured light toward the surface of vibrating apparatus 305. Within the present context, structured light may refer to light comprising a specific illumination pattern. For example, projector 301 may comprise a dot projector or any other structure light projector. Additionally, or alternatively, projector 301 may project uniform light towards the surface of vibrating apparatus 305. Within the present context, "uniform light" may refer to light having a constant intensity emitted from a light source having a substantially constant optical power output, such that for any stationary illuminated target area, the measured intensity of incident light is substantially constant. For example, projector 301 may comprise a light emitting diode (LED) or any other uniform light projector.

In some embodiments, as depicted in FIG. 3, projector 301 may transmit illumination 303 perpendicular to at least part of the surface of vibrating apparatus 305. Additionally, or alternatively, while not depicted in FIG. 3, projector 301 may transmit illumination 303 at an angle to at least part of the surface of vibration apparatus 305.

Although depicted with a single projector 301, some embodiments may include a plurality of projectors. For example, a plurality of projectors may transmit the electromagnetic radiation at different angles. In such embodiments, vibrations and amplitudes may be associated with different depths as well as lengths and widths. Moreover, in some embodiments, vibration within a plane lateral to sensor 309 (as depicted in FIG. 3) may be detected using the different angles of projection and reflection.

In some embodiments, projector 301 may be configured to project a plurality of frequencies. In other embodiments, projector 301 may be configured to use a single frequency or range of frequencies. Such embodiments may be used to distinguish reflections caused by the patterns from noise in system 300. To this end, sensor 309 may be configured, using a hardware-based filter, a software-based filter, and/or an optical filter, to reduce or remove incoming light not matching (or within a threshold frequency of) the frequency (or frequencies) projected by projector 301. For example, the frequencies may be between 50 Hz and a few kHz (e.g., 1 kHz, 2 kHz, 3 kHz, or the like).

Although the embodiment of FIG. 3 is depicted as using projector 301, other embodiments may use ambient light in addition to or in lieu of illumination 303 from projector 301.

As shown in FIG. 3, the projected illumination 303 (and/or ambient light) may cause reflections 307 from a surface of vibrating apparatus 305. The reflections may be captured by sensor 309. In some embodiments, sensor 309 may be an event-based sensor. As explained below, sensor 309 may comprise an array of pixels 400 (see FIG. 4A), an array of pixels 450 (see FIG. 4B), an array of pixels 470 (see FIG. 4C), or an array of any other pixels, coupled with a readout system. Each pixel of sensor 309 may include at least one photosensitive element. The signals generated by sensor 309 may be processed, as further explained below, in order to calculate frequencies for vibrating apparatus 305. The frequencies may be associated with pixels of sensor 309 and, if the locations of projector 301 and the pixels are known, the system may map frequencies to locations in a two-dimensional projection of the surface of vibrating apparatus 305. Other techniques explained herein may be used to calculate depth for the frequency map and/or amplitudes associated with locations in the two-dimensional projection of the surface of vibrating apparatus 305. By depth is intended the distance of apparatus 305 from the sensor 309, which may be computed by triangulation or time-of-flight measurements.

FIG. 4A is a schematic representation of a sensor pixel 400, consistent with embodiments of the present disclosure. Pixel 400 may be one of a plurality of pixels in an array (e.g., a square, a circle, or any other regular or irregular shape formed by the arrayed pixels) of a sensor.

Figure 4B:
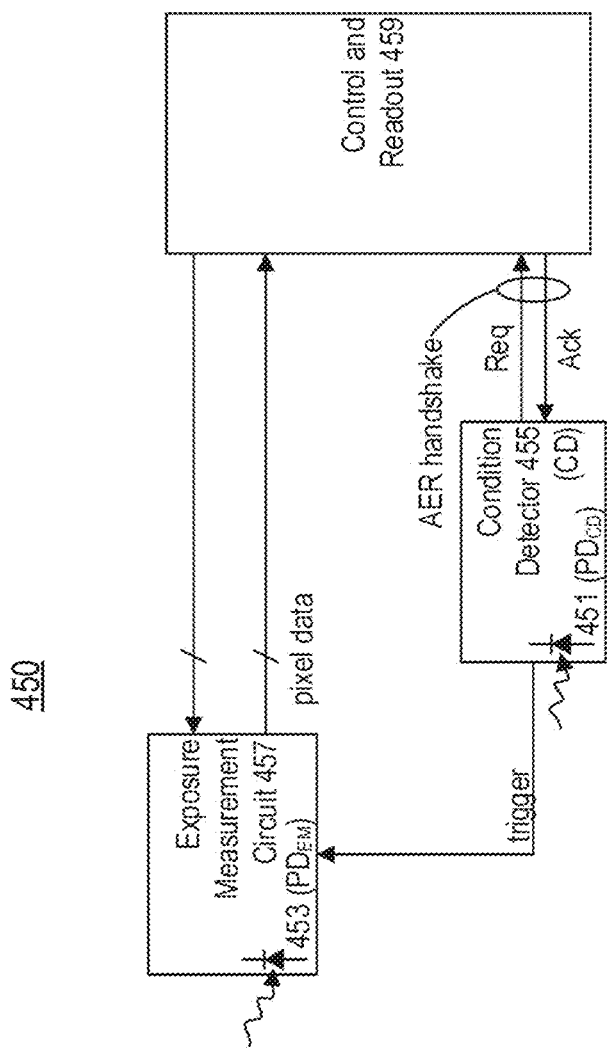
FIG. 4B is a schematic representation of an exemplary asynchronous sensor pixel, according to embodiments of the present disclosure.

As used herein, a "pixel" refers to a smallest element of a sensor that outputs data based on light impinging on the pixel. In some embodiments, a pixel may be larger or include more components than a conventional "pixel" because it may include two or more photosensitive elements, other circuitry, or the like, e.g., as depicted in FIG. 4B, described below.

Although the present disclosure refers to a reflection caused by a projected pattern as being received at a single pixel, the projected pattern may include a sufficient number of photons in order to cover and be received by a plurality of pixels. Accordingly, the triangulation described herein may be based on an average location of the plurality of pixels and/or comprise a plurality of triangulations including the locations of each pixel in the plurality.

As depicted in FIG. 4A, sensor pixel 400 includes a photosensitive element 401. Photosensitive element 401 may generate an electrical signal (e.g., a voltage, a current, or the like) based on brightness of light impinging on element 401. As used herein, a photosensitive element may comprise a photodiode (e.g., a p-n junction or PIN structure) or any other element configured to convert light into an electrical signal. A photodiode may generate a current (e.g., $I_{ph}$) proportional to the intensity of light impinging on the photodiode.

As further depicted in FIG. 4A, sensor pixel 400 also includes a measurement circuit 405. Measurement circuit 405 may convert the current from element 401 to an analog signal for readout. Measurement circuit 405 may activate in response to an external control signal (e.g., an external clock cycle). Additionally, or alternatively, measurement circuit 405 may convert the signal from element 401 to an analog signal that is stored (e.g., in an on-chip and/or off-chip memory (not shown) accessed by pixel 400) until an external control signal is received. In response to the external control signal, measurement circuit 405 may transmit the stored analog signal (the "pixel data" in FIG. 4A) to a readout system.

Although not depicted in FIG. 4A, a sensor using pixel 400 may include row and column arbiters or other timing circuitry such that the array of pixels are triggered according to clock cycles. Moreover, the timing circuitry may manage transfer of analog signals to the readout system, as described above, such that collisions are avoided. The readout system may convert the analog signals from the pixel array to digital signals for use in processing.

FIG. 4B is a schematic representation of a sensor pixel 450, consistent with embodiments of the present disclosure. Pixel 450 may be one of a plurality of pixels in an array (e.g., a square, a circle, or any other regular or irregular shape formed by the arrayed pixels) of the sensor.

As depicted in FIG. 4B, pixel 450 may include at least one photosensitive element 451. Photosensitive element 451 may generate an electrical signal based on brightness of light impinging on element 451. Pixel 450 may further include a condition detector 455 (CD). As shown in the example of FIG. 4B, detector 455 is electrically connected to the photosensitive element 451 ($PD_{CD}$) and is configured to generate a trigger signal (labeled "trigger" in FIG. 4B) when an analog signal proportional to brightness of light impinging on the photosensitive element 451 matches a condition. For example, the condition may comprise whether the analog signal exceeds a threshold (e.g., a voltage or current level). In such an example, the threshold may comprise a fixed threshold or a dynamic threshold. For example, the dynamic threshold may be set based on variations in luminance (or a logarithm of luminance), e.g., as a proportion of a recent luminance level. Additionally or alternatively, one static or dynamic threshold may be used for positive variations while another static or dynamic threshold may be used for negative variations. The analog signal may comprise a voltage signal or a current signal.

As further depicted in FIG. 4B, pixel 450 may also include a photosensitive element 453 that generates an electrical signal based on brightness of light impinging on element 453. Pixel 450 may further include an exposure measurement circuit 457. As shown in FIG. 4B, exposure measurement circuit 457 may be configured to generate a measurement that is a function of brightness of light impinging on the photosensitive element 453 ($PD_{EM}$). Exposure measurement circuit 457 may generate the measurement in response to the trigger signal. Although depicted as using exposure measurement circuit 457 in FIG. 4B, some embodiments may analyze the output signals from the photosensitive element 453 directly (e.g., using control and readout system 459) and omit exposure measurement circuit 457.

In some embodiments, exposure measurement circuit may include an analog-to-digital converter. Examples of such embodiments are disclosed in U.S. Provisional Patent Application No. 62/690,948, filed on Jun. 27, 2018, and titled "Image Sensor with a Plurality of Super-Pixels"; U.S. Provisional Patent Application No. 62/780,913, filed on Dec. 17, 2018, and titled "Image Sensor with a Plurality of Super-Pixels"; and in International Publication No. WO 2020/002562 A1 titled "Image Sensor with a Plurality of Super Pixels," which claims priority to the two aforementioned U.S. provisional patent applications, and which published on Jan. 2, 2020. The disclosures of these applications are expressly incorporated herein by reference. In such embodiments, exposure measurement circuit 457 may reset the condition detector 455 (e.g., using a "clear" signal, not shown in FIG. 4B) when the measurement is completed and/or transmitted to an external readout system.

In some embodiments, exposure measurement circuit 457 may output the measurement asynchronously to a control and readout system 459, e.g., using an address-event representation (AER) communications protocol. In other embodiments, readout from exposure measurement circuit 457 may be clocked using external control signals (e.g., labeled "control" in FIG. 4B). Moreover, as depicted in FIG. 4B, in some embodiments, triggers from detector 455 may also be output to control and readout system 459, e.g., using an asynchronous event readout (AER) communications protocol.

Examples of pixel 450 depicted in FIG. 4B are disclosed in U.S. Pat. No. 8,780,240 and in U.S. Pat. No. 9,967,479. These patents are expressly incorporated herein by reference.

Although depicted as different photosensitive elements, in some embodiments, photosensitive elements 451 and 453 may comprise a single element shared between the condition detector 455 and the exposure measurement circuit 457. Examples of such embodiments are disclosed in European Patent Application No. 18170201.0, filed on Apr. 30, 2018, and titled "Systems and Methods for Asynchronous, Time-Based Image Sensing," and in International Publication No. WO 2019/211317 A1 published on Nov. 7, 2019, which claims priority to the aforementioned European patent application. The disclosure of both these applications is expressly incorporated herein by reference.

Moreover, although depicted with one condition detector and one exposure measurement circuit, some embodiments may include a plurality of exposure measurement circuits sharing a condition detector, such that a trigger signal causes a plurality of measurements to be captured. Examples of such embodiments are disclosed in U.S. Provisional Patent Application No. 62/690,948, filed on Jun. 27, 2018, and titled "Image Sensor with a Plurality of Super-Pixels"; U.S. Provisional Patent Application No. 62/780,913, filed on Dec. 17, 2018, and titled "Image Sensor with a Plurality of Super-Pixels; and in International Publication No. WO 2020/002562 A1 published on Jan. 2, 2020, and titled "Image Sensor with a Plurality of Super Pixels", which claims priority to both aforementioned U.S. provisional patent applications. The disclosures of these applications are expressly incorporated herein by reference.

Although not depicted in FIG. 4B, a sensor using pixel 450 may include row and column lines or other readout circuitry such that events generated by pixel 450 may be read off the sensor. Moreover, the timing circuitry may manage transfer of analog signals to the readout system, as described above, such that collisions are avoided. The readout system may convert the analog signals from the pixel array to digital signals for use in processing.

FIG. 4C is a schematic representation of a sensor pixel 470, consistent with embodiments of the present disclosure. Pixel 470 may be one of a plurality of pixels in an array (e.g., a square, a circle, or any other regular or irregular shape formed by the arrayed pixels) of a sensor.

As depicted in FIG. 4C, sensor pixel 470 includes a photosensitive element 473. Photosensitive element 473 may generate an electrical signal (e.g., a voltage, a current, or the like) based on brightness of light impinging on element 473. As disclosed herein, a photosensitive element may comprise a photodiode (e.g., a p n junction or PIN structure) or any other element configured to convert light into an electrical signal. A photodiode may generate a current proportional to the intensity of light impinging on the photodiode.

As further depicted in FIG. 4A, sensor pixel 407 also includes a change detector 475. Change detector 475 may be configured to output signals when changes in the detected levels of illumination of photosensitive element 473 exceeds a threshold. Change detector 475 may activate in response to a control signal (e.g., a clock cycle or other control signal from a readout system). Change detector 475 may transmit the output signals (the "pixel data" in FIG. 4C) to a readout system.

Although not depicted in FIG. 4C, a sensor using pixel 470 may include row and column arbiters or other timing circuitry such that the array of pixels are triggered according to clock cycles. Moreover, the timing circuitry may manage transfer of output signals to the readout system, as described above, such that collisions are avoided. The readout system may convert the output signals (e.g., using an analog-to-digital converter) from the pixel array for use in processing.

In some embodiments, one or more change detectors may be shared by a plurality of photosensitive elements of an array of pixels. A clock cycle or other control signals may be provided (e.g., from a control and readout system) to regulate the operation of the change detector(s) and the output signals based on the detected illumination levels of the photosensitive elements.

In some embodiments, change detector 475 uses an address-event representation (AER) communications protocol to provide output signals to an external readout system (not shown in FIG. 4C).

Figure 5A:
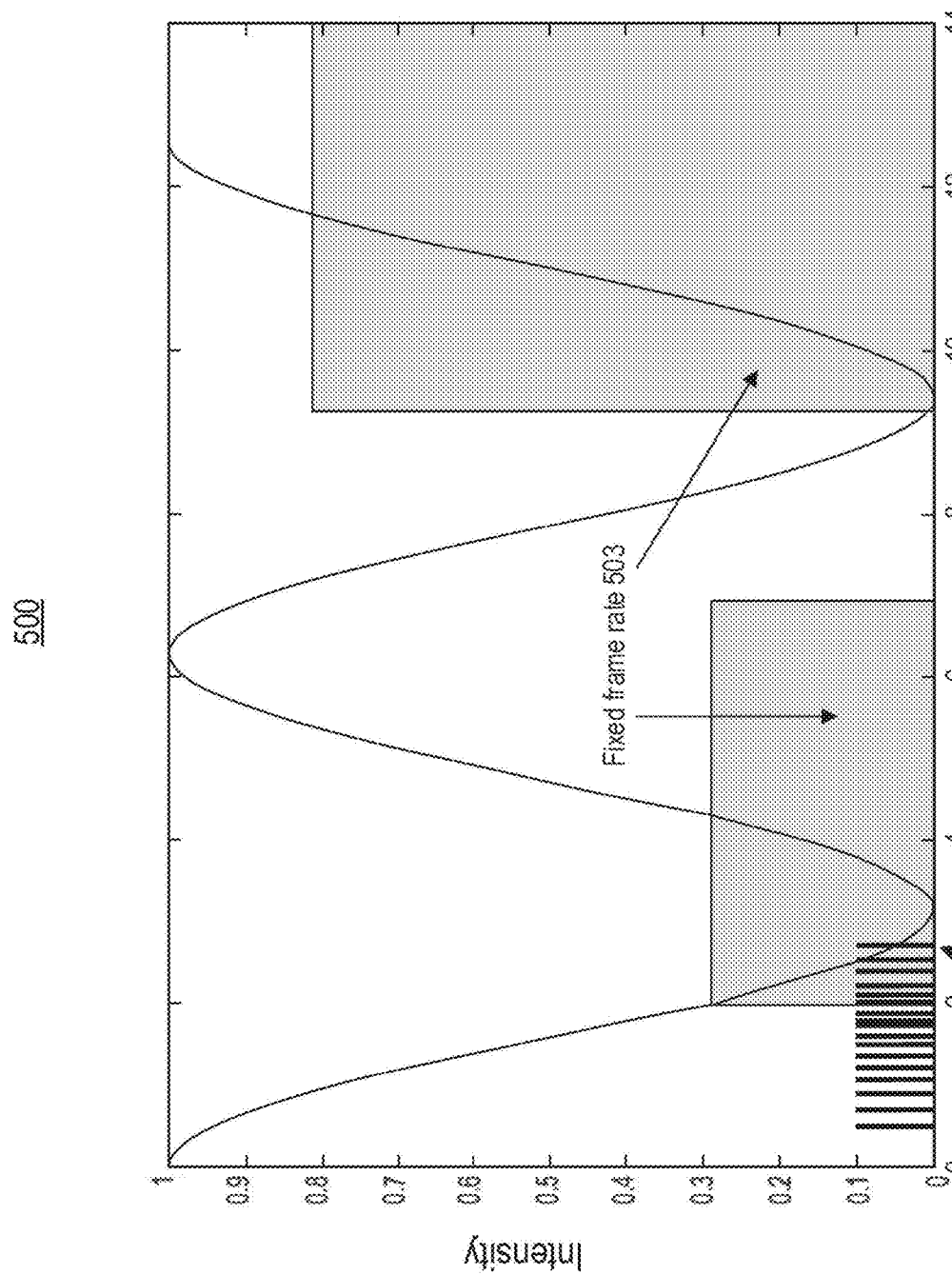
FIG. 5A is a graphical representation of increasing temporal resolution by using an event-based sensor, according to embodiments of the present disclosure.

FIG. 5A is a graphical representation of increasing temporal resolution by using an event-based sensor, consistent with embodiments of the present disclosure. As explained above, event-based sensors can provide greater temporal resolution and thus increase accuracy of the detected vibrational frequencies. An example of this increased accuracy is shown in example 500 of FIG. 5A. The exposure rate 503 of a conventional camera pixel, depicted using shading and as a fixed frame rate, a frequency of vibration in an object in the field of view of the camera (which is, in the example 500 of FIG. 5A, a sinusoid, but may comprise any other function). The y-axis represents intensity over a normalized scale ranging from 0 to 1. Accordingly, the sine wave of example 500 represents temporal variation of light received by the camera due to the vibration, and a length of each shaded box represents the integration time of the conventional camera pixel. Moreover, a height of each shaded box represents the resulting accumulation of impinging light during the integration time.

If the frequency exceeds half of exposure rate 503 (e.g., the Nyquist sampling rate of the conventional pixel), the camera cannot reproduce the signal based on recorded frames. Moreover, as shown in example 500, exposure rate 503 may capture large portions of a wavelength in a single frame, further limiting the time-resolution of the camera, which causes any calculation of frequency therefrom to have low accuracy.

An extant solution is to increase the frame rate for the conventional camera; however, this becomes impractical for many machines and objects that vibrate at high frequencies. Moreover, as the frame rate increases, greater illumination of the object in the field of view of the camera is needed to resolve signal variation within the shorter exposure time. However, this may be impractical depending on the level of illumination required and/or an environment in which the object is being used.

On the other hand, an event-based sensor of the present disclosure may capture a plurality of events (e.g., labeled events 501a, 501b, etc. in FIG. 5A) in the same time an extant camera may capture a single frame. Accordingly, the asynchronous pixels of the sensor generate a pulse each time the signal amplitude crosses a threshold relative to an amplitude at the previous pulse (e.g., as explained above with respect to FIG. 4B). Accordingly, as shown in FIG. 5A, vibrational frequencies may be determined with much greater accuracy based on the difference in timestamps between patterns of events demonstrative of a wave-like pattern or other similar vibrational signature. Moreover, higher frequencies previously unable to be tracked with conventional cameras can be tracked using the event-based sensor. From the generated events, the signal representing the vibration may be reproduced because sufficient information has been captured.

FIG. 5B is a graphical representation relating frequencies to polarity information. As shown in FIG. 5B, events may have associated polarities. For example, events with positive polarities may represent increases in amplitude that exceed a threshold (whether determined from output of image sensor 400 of FIG. 4A or as encoded in events output from image sensor 450 of FIG. 4B). Moreover, a change in polarity may be from positive to negative or from negative to positive. As shown in FIG. 5B, a wavelength may be calculated based on corresponding polarity changes of the same type (e.g., from one negative-to-positive change to a corresponding change or from one positive-to-negative change to a corresponding change). Accordingly, determined events may be used to calculate frequencies of corresponding vibrations represented by the events, as explained below with respect to method 600 of FIG. 6.

Figure 6:
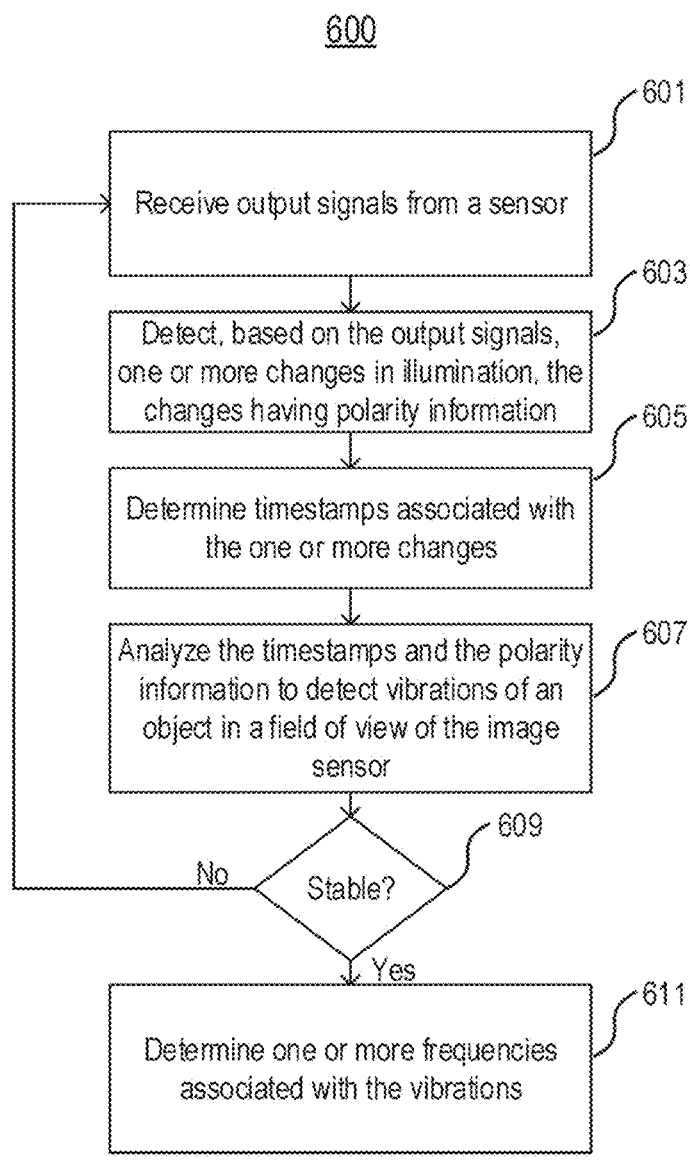
FIG. 6 is a flowchart of an exemplary method for detecting vibration frequencies, according to embodiments of the present disclosure.

FIG. 6 is a flowchart of an exemplary method 600 for detecting vibrations, consistent with embodiments of the present disclosure. Method 600 of FIG. 6 may be performed using at least one processor, whether integrated as a processor on the same chip as a pixel-based sensor (e.g., a sensor with one or more of pixel 400 of FIG. 4A, a sensor with one or more of pixel 450 of FIG. 4B, a sensor with one or more of pixel 470 of FIG. 4C, or the like) or provided separate as part of a processing system. The at least one processor may be in electrical communication with the sensor for purposes of sending and receiving signals, as further disclosed herein.

At step 601, the at least one processor may receive output signals from the sensor. The sensor may comprise a plurality of pixels, each pixel including a photosensitive element, and may output signals indicative of changes in illumination on each pixel (e.g., as explained above with respect to FIGS. 4A-4C). For example, the at least one processor may receive digital signals (e.g., using an on-chip bus connected to at least one transmitter configured to communicate over at least one network, to at least one memory, or the like) indicative of events from the at least one sensor. Additionally, or alternatively, the at least one processor may receive digital signals encoded an amplitude of light impinging on a pixel of the sensor and track the amplitudes over time to detect events.

For example, measurement circuit 405 (see FIG. 4A) may convert a signal from photosensitive element 401 into an analog signal proportional to brightness of light impinging on photosensitive element 401. The at least one processor may receive analog signals from measurement circuit 405 as the one or more first signals or may receive digital signals based on the analog signals from an analog-to-digital converter in communication with measurement circuit 405. Additionally or alternatively, as explained above, condition detector 455 (CD) may generate a trigger signal (e.g., "trigger" in the example of FIG. 4B) when a first analog signal based on light impinging on photosensitive element 451 exceeds a predetermined threshold, and exposure measurement circuit 457 may convert a signal from photosensitive element 453 into a second analog signal proportional to brightness of light impinging on photosensitive element 453 in response to the trigger signal. The at least one processor may receive second analog signals from exposure measurement circuit 457 as the one or more first signals or may receive digital signals based on the second analog signals from an analog-to-digital converter in communication with (or forming a portion of) exposure measurement circuit 457. As a still further example, change detector 475 (see FIG. 4C) may be configured to output signals when changes in the detected levels of illumination on photosensitive element 473 exceed a threshold. At least one processor may be configured to receive the output signals from the change detector, and determine polarities based on the output signals, the polarities being indicative of whether the changes in the detected levels of illumination are increasing or decreasing.

The at least one processor may receive the output signals across a plurality of times. For example, in embodiments using a synchronous sensor, the output signals may have been captured in a plurality of clock cycles. As another example, in embodiments using an asynchronous sensor, the output signals may have been captured at different times. In some embodiments using an asynchronous sensor, the readout may be clocked such that the at least one processor receives some of the output signals in a different clock cycle than it received other of the output signals.

At step 603, the at least one processor may detect, based on the output signals, one or more changes in illumination. The one or more changes may have associated polarity information. For example, the at least one processor may detect an event based on changes in amplitude between two of the output signals received from the sensor having magnitudes greater than one or more thresholds or the like, and then associate a polarity with the detected event. The "polarity" may refer to whether a change in a detected level of illumination is associated with either increasing or decreasing illumination, which may be determined by comparison of successive output signals. In embodiments using a sensor with one or more of pixels (e.g., a sensor with one or more of pixel 400 of FIG. 4A, a sensor with one or more of pixel 450 of FIG. 4B, a sensor with one or more of pixel 470 of FIG. 4C, or the like) the output signals may themselves encode events (as well as associated polarities). In some embodiments, the output signals may be encoded using an address-event representation (AER), e.g., such as depicted in FIG. 4B but also applicable to the examples of FIGS. 4A and 4C. In such embodiments, each event may be encoded as a tuple (x, y, t, p) in which x and y are two-dimensional coordinates of the pixel from which the output signal originated, t is a timestamp at which the pixel captured the event (or at which a readout system (such as system 459) converted the event to a digital output), and p is a polarity of the event (e.g., a zero (0) for negative polarity, such as a decrease in amplitude, and a one (1) for positive polarity, such as an increase in amplitude). Accordingly, the at least one processor may detect the polarity information by determining polarities associated with events of the output signals.

In some embodiments, the at least one processor may be configured to detect a positive polarity from the sensor when a change in illumination is an increasing change and to detect a negative polarity from the sensor when a change in illumination is a decreasing change. Moreover, these polarities may be associated with a set of pixels among the plurality of pixels of the sensor. Accordingly, the at least one processor may determine one or more frequencies (as explained below in step 611) associated with the set of pixels based on the polarities. For example, the determined frequencies may be mapped to locations of the pixels such that an image of the determined frequencies in the two-dimensional plane of the sensor may be formulated.

In some embodiments, the at least one processor may map the determined frequencies based on addresses encoded with the output signals by the sensor. For example, the sensor (or a readout system in communication with the sensor) may encode an address of the pixel(s) from which the output signals originated. Accordingly, the at least one processor may associate the output signals with particular pixels of the sensor based on addresses encoded with the output signals.

At step 605, the at least one processor may determine timestamps associated with the one or more changes in illumination. The timestamps may encode a global time (e.g., Greenwich mean time (GMT), coordinated universal time (UTC), or the like), a system time (e.g., relative to a readout system of the like), or another indicator of temporal distances between the output signals.

In some embodiments, at least one processor may determine the timestamps by extracting the plurality of timestamps from a readout system (e.g., control and readout 459) connected to or otherwise associated with the sensor. For example, the readout system may encode the one or more timestamps based on an address-event representation (AER) protocol. In addition, as explained above, the readout system may be further configured to encode an address identifying an associated pixel for each measurement.

At step 607, the at least one processor may analyze the timestamps and the polarity information to detect vibrations of an object in the field of view of the sensor. In one example, the at least one processor may determine time intervals between changes of one or more polarities using the plurality of timestamps. Such time intervals may represent a wavelength (or other measure of periodicity of a function representing the vibrations) of the vibrating object (e.g., vibrating apparatus 305 of FIG. 3). The at least one processor may further calculate a combinatory value associated with the determined time intervals. For example, the combinatory value may comprise a mean value, a median value, or other statistical combination of the time intervals. The at least one processor may further determine the one or more frequencies of the vibrations based on an inverse of the combinatory value. In embodiments where the time intervals represent a fraction (or a multiple) of a wavelength or other measure of periodicity, the one or more vibrational frequencies may be determined based a frequency adjusted for the fraction (or the multiple). For example, a time interval between different changes of one or more polarities (e.g., from a positive-to-negative change to a negative-to-positive change or from a negative-to-positive change to a positive-to-negative change) may represent a portion of a wavelength (e.g., from a peak to a trough or from a trough to a peak) and thus be adjusted by a corresponding multiple to calculate a wavelength.

In some embodiments, the at least one processor may further determine a deviation value associated with the time intervals. For example, the deviation value may comprise a standard deviation or other measure of error in the time intervals. Additionally, or alternatively, the at least one processor may determine a frequency associated with each time interval and then determine a deviation value associated with the frequencies. In such embodiments, the at least one processor may validate the one or more frequencies based on when the deviation is below a validation threshold. For example, the validation threshold may be between approximately 1% and 10% of the mean value or the median value. If the deviation is not below the threshold, the at least one processor may output a zero frequency, output an error message, throw an exception, or otherwise indicate that the time intervals did not exhibit a consistent frequency.

In some embodiments, the at least one processor may first cluster the time intervals before performing step 607. For example, the at least one processor may cluster time intervals based on magnitudes. Accordingly, the at least one processor may use the calculations described above to determine a primary frequency associated with a cluster having the largest number of time intervals and one or more secondary frequencies associated with clusters having a fewer number of time intervals.

At step 609, the at least one processor may determine whether the analyzed timestamps satisfy one or more stability criteria. For example, as explained above with respect to step 607, a validation threshold may exclude time intervals that do not exhibit a consistent frequency. Additionally, or alternatively, time intervals that are themselves too short or too long may be excluded as anomalistic. Additionally or alternatively, the stability criteria may include one or more of periodicity measures, variations in rates of change within or of frequencies determined based on the timestamps, movement of the timestamps across pixels, variations in a number of detected events within each period of the frequency, or the like. Moreover, when the analyzed timestamps do not reflect a stable frequency or frequencies, the at least one processor may output a zero frequency, output an error message, throw an exception, or otherwise indicate that the time intervals did not exhibit a consistent frequency. However, some embodiments may exclude step 609 altogether.

At step 611, the at least one processor may determine one or more frequencies of the detected vibrations. For example, as explained above with respect to step 607, the one or more frequencies may comprise inverses of combinatory values of the time intervals. In another example, the at least one processor may identify a series of events from the output signals indicative of increasing or decreasing portions of the vibrational signature. The at least one processor may then map events to points on a predicted vibrational signature and identify points that are expected to be one wavelength (or a fraction of a wavelength or a multiple of a wavelength apart). The at least one processor may use inverses of time intervals between the identified points to determine the one or more frequencies.

In some embodiments, method 600 may include additional steps. For example, the at least one processor may filter changes in illumination to remove spurious events. For example, as explained above, the at least one processor may eliminate time intervals that are too long and/or too short. In such an example, the at least one processor may eliminate timestamps having a difference that are separate by a time interval greater than a time threshold and/or eliminate such time intervals greater than the time threshold. Accordingly, the at least one processor may delete (or otherwise ignore) the timestamps themselves or may ignore the time interval exceeding the time threshold while still using the timestamps to calculate time intervals within the time threshold relative to other timestamps. For example, the time threshold may be approximately 1 ms or more. Thus, any corresponding events having a time interval of 1 ms or more are too remote to represent a wavelength (or a fraction or multiple thereof) of a vibrational signature. The time threshold may be adjusted in accordance with the range of frequencies expected to be measured by the system.

In some embodiments not shown in FIG. 6, method 600 may be recursive. For example, the at least one processor may repeat steps 601, 603, 605, 607, and 609 with each new set of output signals from the sensor (e.g., generated and/or received in the next clock cycle). The new output signals may generate calculation of new frequencies and/or a comparison of one or more frequencies associated with the new output signals with the one or more frequencies calculated in the previous iteration of step 611. Accordingly, the at least one processor may detect any changes from the previous one or more frequencies and the new frequency or frequencies and generate an alert or other error message if the change is unexpected. Additionally, or alternatively, the at least one processor may determine if any changes from the previous one or more frequencies and the new frequency or frequencies are associated with an expected event (e.g., powering on, powering off, or the like) and generate a message accordingly.

In some embodiments, the at least one processor may further determine depths associated with the one or more frequencies. For example, in addition to mapping frequencies to particular pixels that generated polarity changes used to determine the frequencies, the at least one processor may use a time-of-flight algorithm, triangulation, or other calculation based on a known location from which transmitted light originated (e.g., locations associated with projector 301 of FIG. 3) to determine a depth associated with the pixel. Thus, a multi-dimensional mapping of frequencies may be generated.

Although method 600 determines frequencies, embodiments of the present disclosure may also determine amplitudes. Thus, the at least one processor may further analyze measurements associated with one or more of the plurality of pixels to determine one or more amplitudes of the vibrations. For example, the at least one processor may apply a spatial filter (e.g., a Gaussian filter or the like) to measurements from the plurality of pixels and determine, based on the applied spatial filter, the one or more amplitudes. In embodiments where the shape of the vibrating object is known (e.g., stored in a database accessible by the at least one processor; received by the at least one processor over a port, such as a network port or a peripheral port; or the like), the at least one processor may retrieve a shape of an object undergoing the vibrations and perform two-dimensional shape tracking on the measurements to determine the one or more amplitudes. For example, the two-dimensional shape tracking may comprise applying an iterative closest point algorithm.

Figure 7:
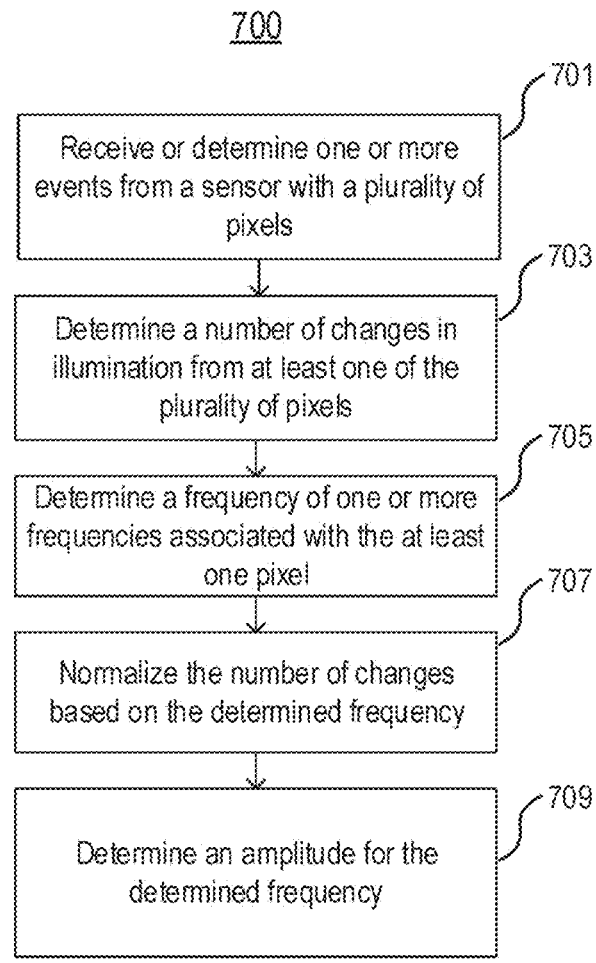
FIG. 7 is a flowchart of an exemplary method for connecting events from a sensor into clusters, consistent with embodiments of the present disclosure.

Additionally, or alternatively, FIG. 7 depicts an example method 700 for determining amplitudes of vibrations based on frequencies detected using, e.g., method 600, applied to signals from a pixel-based sensor, e.g., a sensor with one or more of pixel 400 of FIG. 4A, a sensor 450 with one or more of pixel 450 of FIG. 4B, or the like.

As stated above, FIG. 7 illustrates a flowchart of an example method 700 for determining amplitudes of vibrations using detected frequencies, consistent with embodiments of the present disclosure. Method 700 of FIG. 7 may be performed using at least one processor, whether integrated as a processor on the same chip as a sensor (e.g., a sensor with one or more of pixel 400 of FIG. 4A, a sensor 450 with one or more of pixel 450 of FIG. 4B, a sensor with one or more of pixel 470 of FIG. 4C, or the like) or provided separate as part of a processing system. The at least one processor may be in electrical communication with the sensor for purposes of sending and receiving signals, as further disclosed herein.

At step 701, the at least one processor may receive or determine an event from a sensor (e.g., a sensor with one or more of pixel 400 of FIG. 4A, a sensor 450 with one or more of pixel 450 of FIG. 4B, a sensor with one or more pixel 470 of FIG. 4C, or the like). As described above with respect to step 603 of method 600, the event may comprise an output signal from an event-based sensor or an event extracted from output signals of a continuous sensor (e.g., using a clock circuit).

At step 703, the at least one processor may determine a number of changes in illumination from at least one of a plurality of pixels within a unit of time. In some embodiments, the unit of time may be approximately 1 ms or less. The changes in illumination may be encoded as events. For example, the at least one processor may have received or decoded the events from a sensor (e.g., a sensor with one or more of pixel 400 of FIG. 4A, a sensor 450 with one or more of pixel 450 of FIG. 4B, a sensor with one or more of pixel 470 of FIG. 4C, or the like). As described above with respect to step 603 of method 600, the event may comprise a signal from an event-based sensor or an event extracted from signals of a continuous sensor (e.g., using a clock circuit).

At step 705, the at least one processor may determine a frequency of one or more frequencies associated with the at least one pixel. For example, the frequency may be determined using method 600 or a similar calculation converting events (or polarity changes) to frequencies.

At step 707, the at least one processor may normalize the number of changes by the determined frequency. For example, the at least one processor may divide the number of changes by the determined frequency.

At step 709, the at least one processor may determine one or more amplitudes associated with the determined frequency using the normalization. For example, the amplitude may comprise the output of step 707 or may comprise the output of step 707 scaled, e.g., according to a factor based on a known shape of the object undergoing vibration or the like.

Figure 8:
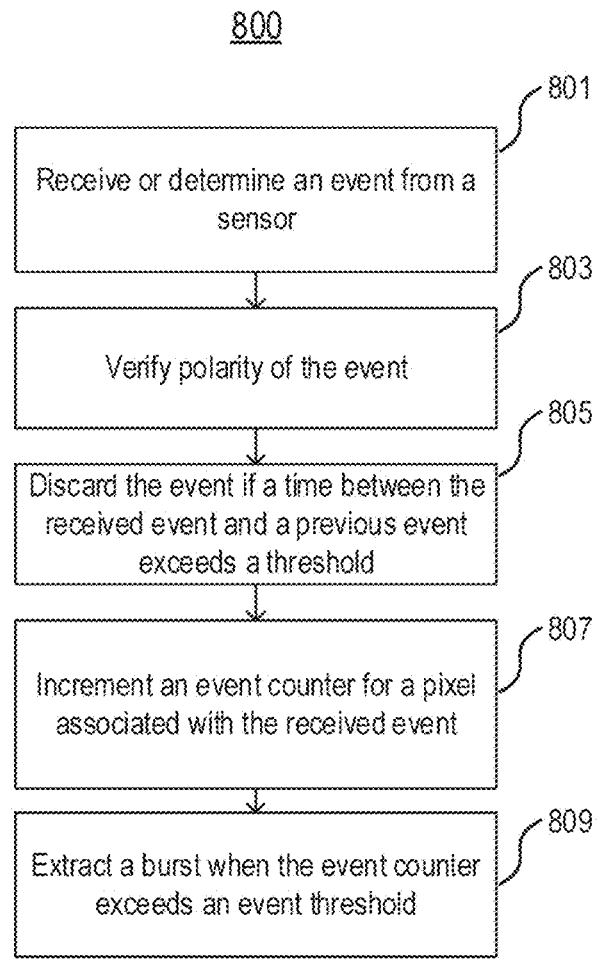
FIG. 8 is a flowchart of an exemplary method for connecting events from a sensor into clusters, consistent with embodiments of the present disclosure.

FIG. 8 is a flowchart of an exemplary method 800 for detecting event bursts, consistent with embodiments of the present disclosure. Method 800 of FIG. 8 may be performed using at least one processor, whether integrated as a processor on the same chip as a sensor (e.g., a sensor with one or more of pixel 400 of FIG. 4A, a sensor 450 with one or more of pixel 450 of FIG. 4B, a sensor with one or more of pixel 470 of FIG. 4C, or the like) or provided separate as part of a processing system. The at least one processor may be in electrical communication with the sensor for purposes of sending and receiving signals, as further disclosed herein.

At step 801, the at least one processor may receive or determine an event from a sensor (e.g., a sensor with one or more of pixel 400 of FIG. 4A, a sensor 450 with one or more of pixel 450 of FIG. 4B, a sensor with one or more of pixel 470 of FIG. 4C, or the like). As described above with respect to step 603 of method 600, the event may comprise an output signal from an event-based sensor or an event determined from output signals of a continuous sensor (e.g., using a clock circuit).

At step 803, the at least one processor may determine or verify the polarity of the event. For example, the at least one processor may determine whether the polarity matches a polarity expected for the event, whether the same as a previous event if a plurality of increases or decreases are expected or different than the previous event if a polarity change is expected. For example, the projected patterns may be configured to always generate a plurality (such as 2, 3, or the like) of events in order to signal an increasing signal or a decreasing signal. Such a plurality may allow for filtering of noise at step 803. If the polarity is not valid, the at least one processor may discard the event and start over at step 801 with a new event. Additionally, or alternatively, if the polarity is not valid, the at least one processor may discard a current burst and use the event from step 801 as the beginning of a new potential burst.

At step 805, the at least one processor may discard the received event if too remote in time from a previous event (e.g., if a difference in time exceeds a threshold). Accordingly, the at least one processor may avoid connecting events too remote in time to form part of a single burst. If the event is too remote, the at least one processor may discard the event and start over at step 801 with a new event. Additionally, or alternatively, if the event is too remote, the at least one processor may discard a current burst and use the event from step 801 as the beginning of a new potential burst.

At step 807, the at least one processor may increment an event counter of an associated pixel. For example, the associated pixel may comprise the pixel from which the event of step 801 was received. The event counter may comprise an integer counting events received at recursive executions of step 801 that qualify, under steps 803 and 805, as within the same burst.

At step 809, the at least one processor may extract a burst when the event counter exceeds an event threshold. For example, the event threshold may comprise between 2 and 10 events. In other embodiments, a greater event threshold may be used. If the burst is extracted, the at least one processor may reset the event counter. If the event counter does not exceed the event threshold, the at least one processor may return to step 801 without resetting the event counter. Accordingly, additional events that qualify, under steps 803 and 805, as within the same burst may be detected and added to the event counter at step 807.

In some embodiments, method 800 may further include discarding the received event if too remote in time from a first event of a current burst. Accordingly, method 800 may prevent noise from causing a burst to be inadvertently extended beyond a threshold.

Additionally, or alternatively, method 800 may track a number of events by region such that bursts are detected only within regions rather than across a single pixel or the whole sensor. Accordingly, method 800 may allow for detection of concurrent bursts on different portions of a sensor.

Whenever an event is discarded, the at least one processor may reset the event counter. Alternatively, in some embodiments, the at least one processor may store the corresponding event counter even when an event is discarded. Some embodiments may use a combination of saving and discarding. For example, the event counter may be saved if an event is discarded at step 803 but may be reset if an event is discarded at step 805.

By detecting bursts rather than individual events, the at least one processor may measure time intervals between polarity changes with greater accuracy. For example, the at least one processor may use method 800 to eliminate spurious events that represent noise or other imperfections in measurement that would reduce the accuracy of calculated frequencies (and thus amplitudes as well). Exemplary embodiments and features for implementing method 800 is described in International Patent Application No. PCT/EP2019/051919, filed on Jan. 30, 2019, and titled "Method and Apparatus of Processing a Signal from an Event-Based Sensor," and which published as International Publication No. WO 2019/145516 A1 on Aug. 1, 2019. The disclosure of this application and its publication is expressly incorporated herein by reference.

Additionally with or alternatively to method 800, the at least one processor may cluster events before analyzing the clusters for frequencies. For example, the at least one processor may cluster events for which at least one connectivity or other criterion is met. For example, the at least one processor may determine a temporal distance between new events and one or more recent events and connect them if the temporal distance satisfies a threshold. Additionally, or alternatively, the at least one processor may determine a spatial distance between new events and one or more recent events and connect them if the spatial distance satisfies a threshold. Accordingly, the at least one connectivity criterion may comprise a temporal threshold, a spatial threshold, or any combination thereof. In one combinatory example, the spatial threshold may be adjusted based on which of a plurality of temporal thresholds are satisfied. In such an example, events closer in time may be expected to be closer in space. In another combinatory example, the temporal threshold may be adjusted based on which of a plurality of spatial thresholds are satisfied. In such an example, events closer in space may be expected to be closer in time. An exemplary clustering algorithm is described in European Patent Application No. 19154401.4, filed on Jan. 30, 2019, and titled "Method of Processing Information from an Event-Based Sensor." The disclosure of this application is expressly incorporated herein by reference.

By clustering events across time and discarding (or otherwise ignoring) events not clustered, the at least one processor may eliminate spurious time intervals between polarity changes that represent noise or other imperfections in measurement that would reduce the accuracy of calculated frequencies (and thus amplitudes as well). By clustering events across space and discarding (or otherwise ignoring) events not clustered, the at least one processor may track vibrational patterns exhibited by a surface of an object in the field of view of the pixels (e.g., vibrating apparatus 305 of FIG. 3) across the pixels (e.g., if the amplitude of the vibration is large enough such that at least some reflections caused by a vibrating object (or component) are received by different pixels than other reflections caused by the vibrating object (or component).

Figure 9:
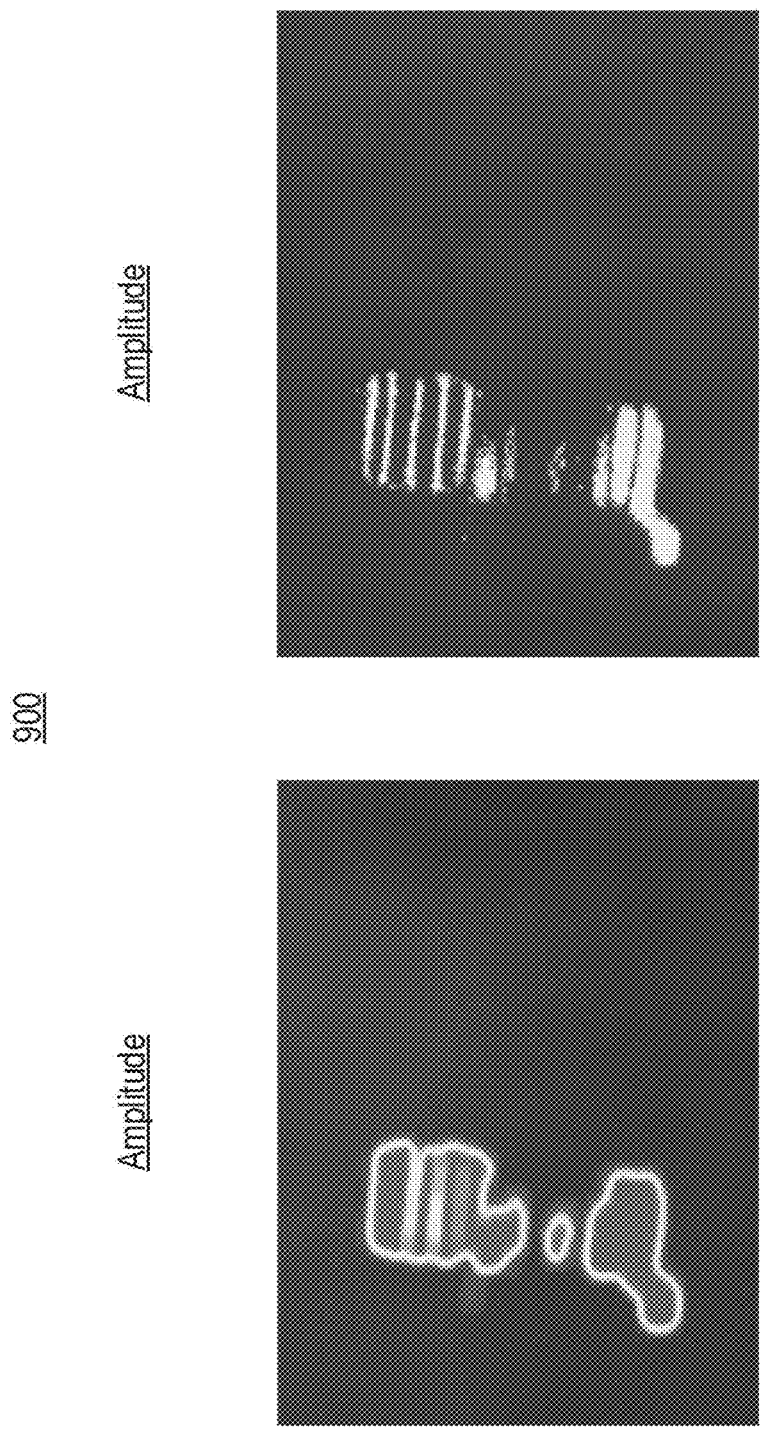
FIG. 9 is a graphical illustration of an exemplary two-dimensional image of frequencies and amplitudes generated by embodiments of the present disclosure.

FIG. 9 illustrates an example 900 of frequency detection using polarity mapping (as explained above) and clustering before amplitude determination from the output of a Sisley® camera. An object depicted (e.g., a motor) may be detected early by unexpected shifts in frequency or amplitude, and such shifts may be detected within a two-dimensional image rather than within an overall average for an entire surface. Example 900 includes a two-dimensional image of detected frequencies and a similar two-dimensional image of detected amplitudes.

Although embodiments of a sensor have been described herein with reference to the examples of FIGS. 4A-4C, any form of sensor adapted to capture signals based on the brightness of light impinging on one or more photosensitive elements (e.g., pixels) may be used. Accordingly, any combination of transistors, capacitors, switches, and/or other circuit components arranged to perform such capture may be used in the systems of the present disclosure. Moreover, the embodiments of the present disclosure may use any synchronous sensors (such as a sensor with one or more of pixel 400 of FIG. 4A) or any event-based sensors (such as a sensor with one or more of pixel 450 of FIG. 4B), or any variation thereof (such as a sensor with one or more of pixel 470 of FIG. 4C).

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

The invention claimed is:

1. A system for detecting vibrations, comprising:
a sensor comprising a plurality of pixels, each pixel including at least one photosensitive element, the sensor being configured to output signals related to illumination on each pixel; and
at least one processor configured to:
receive the output signals from the sensor;
determine, based on the output signals, one or more changes in the illumination, the one or more changes comprising polarity information, the polarity information being indicative of whether the one or more changes in the illumination are associated with increasing or decreasing the illumination;
determine timestamps associated with the one or more changes;
analyze the timestamps and the polarity information to detect vibrations of an object in a field of view of the sensor by calculating time intervals between changes of the polarities using the timestamps; and
determine one or more frequencies of the detected vibrations based on the calculated time intervals.

2. The system of claim 1, wherein the at least one processor is configured to determine a positive polarity when a change in the illumination is indicative of an increase in the illumination, and to determine a negative polarity when the change in the illumination is indicative of a decrease in the illumination.

3. The system of claim 1, wherein the one or more changes in the illumination are associated with a set of pixels among the plurality of pixels of the sensor.

4. The system of claim 3, wherein the one or more frequencies are associated with the set of pixels based on the changes in the illumination.

5. The system of claim 1, wherein the at least one processor is configured to determine the timestamps by extracting a plurality of timestamps from a readout system associated with the sensor.

6. The system of claim 5, wherein the readout system encodes the plurality of timestamps based on an address-event representation (AER) protocol.

7. The system of claim 5, wherein the readout system encodes an address identifying an associated pixel for each output signal.

8. The system of claim 1, wherein the at least one processor is further configured to:
calculate a mean value or a median value, and a deviation associated with the calculated time intervals;
determine the one or more frequencies based on an inverse of the mean value when the mean value is calculated, or determine the one or more frequencies based on the median value when the median value is calculated; and
validate the one or more frequencies when the deviation is below a validation threshold.

9. The system of claim 8, wherein the validation threshold is greater than or equal to 1%, and less than or equal to 10% of the mean value when the mean value is calculated, or the validation threshold is greater than or equal to 1%, and less than or equal to 10% of the median value when the median value is calculated.

10. The system of claim 1, wherein the at least one processor is configured to analyze output signals associated with one or more of the plurality of pixels to determine one or more amplitudes of the vibrations.

11. The system of claim 10, wherein the at least one processor is configured to apply a spatial filter to the output signals associated with the one or more of the plurality of pixels, and determine, based on the applied spatial filter, the one or more amplitudes.

12. The system of claim 10, wherein the at least one processor is configured to determine a shape of an object undergoing the vibrations, and perform two-dimensional shape tracking on the output signals associated with the one or more of the plurality of pixels to determine the one or more amplitudes.

13. The system of claim 12, wherein the at least one processor is configured to perform the two-dimensional shape tracking by applying an iterative closest point algorithm.

14. The system of claim 10, wherein the at least one processor is configured to determine a number of changes in illumination from at least one of the plurality of pixels within a unit of time, and normalize the number of changes by a determined frequency of one or more frequencies associated with the at least one pixel to determine the one or more amplitudes.

15. The system of claim 14, wherein the unit of time is less than or equal to 1 millisecond.

16. The system of claim 1, further comprising an external light source configured to project light on the object in the field of view of the sensor.

17. The system of claim 16, wherein the light has a constant illumination.

18. The system of claim 16, wherein the light comprises a structured illumination pattern.

19. The system of claim 16, wherein the external light source is configured to project the light at an angle oblique to at least one surface of the object.

20. The system of claim 1, wherein the at least one processor is further configured to filter the one or more changes in the illumination to remove spurious changes.

21. The system of claim 1, wherein the at least one processor is further configured to eliminate at least one timestamp of the timestamps, the at least one timestamp having a difference greater than or equal to a time threshold.

22. The system of claim 21, wherein the time threshold is greater than or equal to 1 millisecond.

23. A method for detecting vibrations, comprising:
receiving, from a sensor including a plurality of pixels, output signals associated with illumination on one or more of the plurality of pixels, each of the plurality of pixels including at least one photosensitive element;

determining polarities based on the output signals, the polarities being indicative of whether the illumination on the one or more pixels is increasing or decreasing;

determining timestamps associated with the output signals;

analyzing the timestamps and the polarities to detect vibrations of an object in a field of view of the sensor by calculating time intervals between changes of the polarities using the timestamps; and determining one or more frequencies of the detected vibrations based on the calculated time intervals.

24. The method of claim 23, further comprising determining a positive polarity when the illumination on the one or more pixels is increasing, and determining a negative polarity when the illumination on the one or more pixels is decreasing.

25. The method of claim 23, further comprising determining the timestamps by extracting a plurality of timestamps from a readout system associated with the sensor.

26. The method of claim 25, wherein the readout system encodes the plurality of timestamps based on an address-event representation (AER) protocol.

27. The method of claim 25, wherein the readout system encodes an address identifying an associated pixel for each output signal.

28. The method of claim 23, further comprising analyzing the timestamps by calculating time intervals between changes of the one or more polarities using the timestamps, and determining the one or more frequencies based on the calculated time intervals.

29. A non-transitory computer readable medium, comprising instructions, which when executed by at least one processor, configure the at least one processor to carry out the method of claim 23.

* * * * *